UNITED STATES PATENT OFFICE.

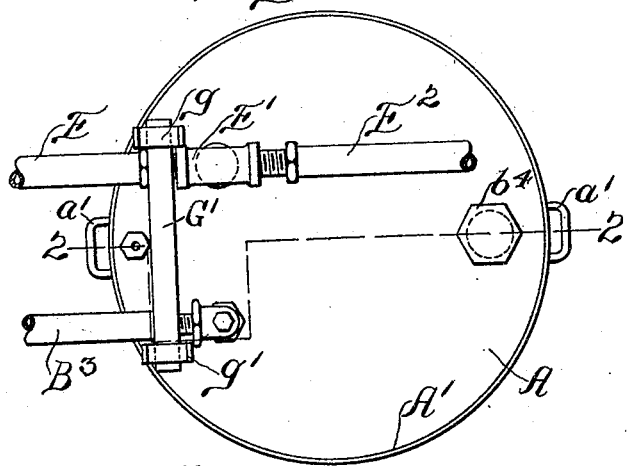
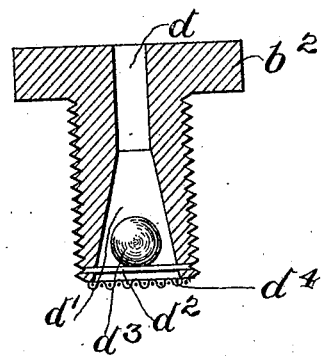
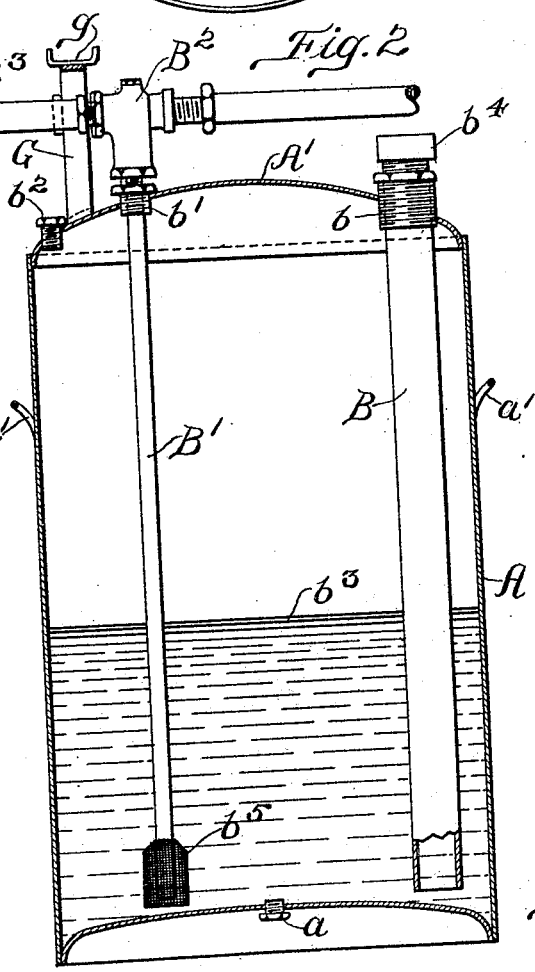
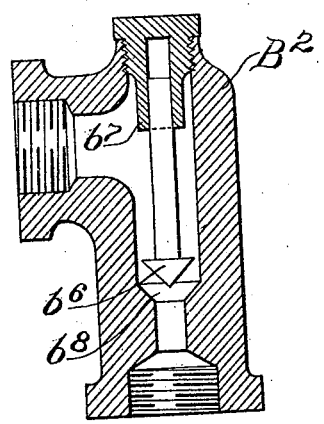

JOHN A. MUELLER, OF CLIFTONDALE, MASSACHUSETTS.

FUEL TANK FOR TORCHES AND THE LIKE.

1,405,147.                Specification of Letters Patent.    Patented Jan. 31, 1922.

Application filed April 5, 1921. Serial No. 458,795.

*To all whom it may concern:*

Be it known that I, JOHN A. MUELLER, a citizen of the United States, and resident of Cliftondale, in the county of Essex and State of Massachusetts, have invented a new and useful Fuel Tank for Torches and the like, of which the following is a specification.

The principal objects of my invention are to increase the safety and efficiency of fuel tanks to be used for various purposes but more particularly to hold oil to be fed to vacuum torches.

A feature of my invention is a valve to prevent spilling of the oil in case the tank is tipped too far or in case the tank is filled too full.

Another feature is the combination of said valve with a check valve.

Another feature is the combination of the spilling-prevention valve with a feed pipe for the tank.

Another feature is a guard more fully described below.

Other features will be pointed out below.

In the drawing

Figure 1 is a plan of a tank embodying my invention;

Figure 2 is an elevation of the same, partly in section;

Figure 3 is an enlarged detail of the valve to prevent spilling; and

Figure 4 is an enlarged detail of the check valve.

Tank A has a suitable drain plug $a$ and handles $a'$. The cover $A'$ may be soldered or otherwise suitably secured in place and is perforated for suitable reception and holding of pipe bushings $b$ and $b'$ and valve seat member $b^2$. Safety filling pipe B is suitably connected to bushing $b$ and is used as an inlet for the oil or other material $b^3$ and extends nearly to the bottom of the tank to prevent gases from escaping at the filling point. Cap $b^4$ is provided for pipe B.

B' is a suction pipe having a fine mesh strainer $b^5$ at the bottom, said pipe leading to joint member $B^2$ which in turn is connected to flexible conduit $B^3$ leading, for example, to a vacuum torch such as is shown in my pending application filed January 21, 1921, Ser. No. 438858. In the joint member I provide a non-return valve $b^6$ guided at $b^7$ and which will be drawn up away from its seat $b^8$ by the vacuum but which will engage its seat to prevent pressure on the tank in case, for example, of an accident to the burner head.

The valve seat member $b^2$ has a passage $d$ and a larger conical passage $d'$ and is provided with a bar $d^2$ to hold ball $d^3$ from falling out. I also suitably attach to the bottom of member $b^2$ a fine mesh wire screen $d^4$ to act as a flame arrester in case any gas should come out through passages $d$ and $d'$ and become ignited outside of the tank.

E is a flexible conduit to conduct air to the torch, this conduit being preferably connected to joint member $E'$ which is connected to the top of the tank and which in turn is connected to flexible conduit $E^2$ leading to the source of compressed air.

I provide a guard for the flexible conduits E and $B^3$ where they join the members $E'$ and $B^2$ this guard consisting of two upright portions welded to the cover $A'$ and as these are alike I show only one, namely G, these portions being connected by cross-bar $G'$ the latter being provided at each end with channels $g$ and $g'$ so that the torch itself may conveniently rest in these channels when not in use.

In using my tank the oil or other fuel $b^3$ will enter by way of pipe B, member $b^2$ co-operating with pipe B in this filling action by permitting escape of air outward through passages $d$ and $d'$. When the oil is to be drawn off by vacuum action member $b^2$ co-operates with $B'$ by permitting the inward passage of air through passages $d$ and $d'$. Member $b^2$ has another function which is to engage ball $d^3$ in case the tank is tipped over, the result being that the oil can not escape because the ball $d^3$ will engage the wall of passage $d'$ and consequently the danger of fire from the spilling of oil is averted.

It will thus be seen that the member $b^2$ has four functions, namely, permitting the outward passage of air to cooperate with pipe B for filling, permitting the inward passage of air to cooperate with pipe B' for drawing off, to prevent spilling of oil and to provide a flame arrester.

What I claim is:

1. A tank for liquid fuel comprising a suction conduit; a check valve therein; an opening normally above the fuel and leading from the atmosphere so as to cooperate with said conduit; and means acting automatically to close said opening to prevent escape of the fuel through said opening.

2. A tank for liquid fuel comprising a suction conduit; a check valve therein; a conduit leading into the tank for feeding the fuel into the tank; an opening normally above the fuel and permitting the entrance of air so as to cooperate with said suction conduit and permitting the egress of air so as to cooperate with said other conduit; and means acting automatically to close said opening to prevent escape of the fuel through said opening.

3. A device of the character described comprising a feed conduit; a tank; a member to connect said conduit with the tank; and a guard to protect the joint between said conduit and said member, said guard having provision for holding the torch when the latter is not in use.

JOHN A. MUELLER.